(12) United States Patent
Cho et al.

(10) Patent No.: US 8,793,775 B2
(45) Date of Patent: Jul. 29, 2014

(54) APPARATUS AND METHOD FOR MANAGING WEB BASED SERVICE ACCOUNT

(75) Inventors: Seong Chul Cho, Daejeon (KR); Hyung Jin Kim, Chungcheongnam-do (KR); Gweon Do Jo, Daejeon (KR); Dae ho Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 271 days.

(21) Appl. No.: 12/969,108

(22) Filed: Dec. 15, 2010

(65) Prior Publication Data

US 2011/0145905 A1 Jun. 16, 2011

(30) Foreign Application Priority Data

Dec. 15, 2009 (KR) .......................... 10-2009-0124463

(51) Int. Cl.
*G06F 15/16* (2006.01)
*G06F 21/00* (2013.01)
(52) U.S. Cl.
USPC .............................................. 726/7; 709/206
(58) Field of Classification Search
USPC ............... 726/7; 709/204, 206, 207, 224, 225
See application file for complete search history.

(56) References Cited

U.S. PATENT DOCUMENTS

| 2005/0246420 | A1 | 11/2005 | Little | |
|---|---|---|---|---|
| 2007/0101008 | A1* | 5/2007 | Gomez | 709/228 |
| 2007/0192493 | A1* | 8/2007 | Manolache et al. | 709/226 |
| 2009/0113532 | A1* | 4/2009 | Lapidous | 726/7 |
| 2009/0186638 | A1* | 7/2009 | Yim et al. | 455/466 |

FOREIGN PATENT DOCUMENTS

| KR | 2001-0108582 | 12/2001 |
|---|---|---|
| KR | 1020040083945 | 10/2004 |
| KR | 10-2006-0061640 | 6/2006 |
| KR | 1020060070608 | 6/2006 |
| KR | 10-2007-0071389 | 7/2007 |

* cited by examiner

*Primary Examiner* — Brandon Hoffman
*Assistant Examiner* — Samuel Ambaye
(74) *Attorney, Agent, or Firm* — Nelson Mullins Riley & Scarborough LLP; Anthony A. Laurentano, Esq.

(57) ABSTRACT

Provided is a method and apparatus for managing a web based service account. The web based service account management apparatus may select, from among web based service accounts, an account undesired to be exposed to others, and may display an account set with a hiding indication only when a user authenticated through a user authentication process desires to read the account.

16 Claims, 4 Drawing Sheets

APPARATUS AND METHOD FOR MANAGING WEB BASED SERVICE ACCOUNT

CROSS-REFERENCE TO RELATED APPLICATION

This application claims the benefit of Korean Patent Application No. 10-2009-0124463, filed on Dec. 15, 2009, in the Korean Intellectual Property Office, the disclosure of which is incorporated herein by reference.

BACKGROUND

1. Field of the Invention

The present invention relates to a method and apparatus for managing a web based service account, and more particularly, to a method and system that may protect privacy of a user using a web based service by protecting a particular user or a particular group undesired to be exposed to others.

2. Description of the Related Art

In a web based email service being currently used, when an identification (ID) and a password of a corresponding user are entered, any user can read a mail transmitted from or to the corresponding user. In addition, in the current web based email service, when the ID and the password are entered, any user can read IDs or nicknames of people being registered by the corresponding user. In this case, information regarding people with whom the corresponding user has been corresponding mails, contents of the mails, people with whom the corresponding user has had a conversion through a messenger, and the like may be easily exposed to others. Even though a password input is required to prevent the exposure, a corresponding password may be compulsorily or erroneously known. In this case, information of people associated with a user using a web based service and contents corresponded between the people and the user may be exposed to others.

Accordingly, there is a desire for an account management apparatus and method that may protect privacy of a user by protecting information undesired to be exposed to others.

SUMMARY

An aspect of the present invention provides a method and apparatus for managing a web based service account that may set a hiding indication with respect to an account desired to be protected by a user, and thereby may protect information of the account set with the hiding indication even though an identification (ID) and a password of the user are exposed.

An aspect of the present invention also provides a method and apparatus for managing a web based service account that may cut off receiving of a message and the like by making a user account of a particular user invisible during a particular period of time and thereby may protect privacy of the particular user.

According to an aspect of the present invention, there is provided an apparatus for managing a web based service account, including: an account selector to select at least one user account; and a hiding setting unit to set a hiding indication with respect to the selected at least one user account.

The account selector may select, from email accounts, at least one user account undesired to be exposed to others.

The account selector may select, from messenger user accounts, at least one user account undesired to be exposed to others.

The hiding setting unit may store, in a predetermined mail box, a mail received from the at least one user account and a mail transmitted to the at least one user account.

The hiding setting unit may set the hiding indication by setting a new nickname with respect to the at least one user account.

The hiding setting unit may set the hiding indication by setting a password with respect to the at least one user account.

The same character string as a user account address may be set as a basic password.

The apparatus may further include a hiding release unit to expose a user account set with the hiding indication when a predetermined criterion is satisfied.

When a password of the user account set with the hiding indication is input, the hiding release unit may expose the user account set with the hiding indication.

When the same character string as a nickname of the user account set with the hiding indication is input, the hiding release unit may expose the user account set with the hiding indication.

According to another aspect of the present invention, there is provided a method for managing a web based service account, including: selecting at least one user account; and setting a hiding indication with respect to the selected at least one user account.

The method may further include exposing a user account set with the hiding indication when a predetermined criterion is satisfied.

The exposing may include exposing the user account set with the hiding indication when a password of the user account set with the hiding indication is input.

According to embodiments of the present invention, there may be provided a method and apparatus for managing a web based service account that may set a hiding indication with respect to an account desired to be protected by a user, and thereby may protect information of the account set with the hiding indication even though an ID and a password of the user are exposed.

Also, according to embodiments of the present invention, there may be provided a method and apparatus for managing a web based service account that may cut off receiving of a message and the like by making a user account of a particular user invisible during a particular period of time and thereby may protect privacy of the particular user.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
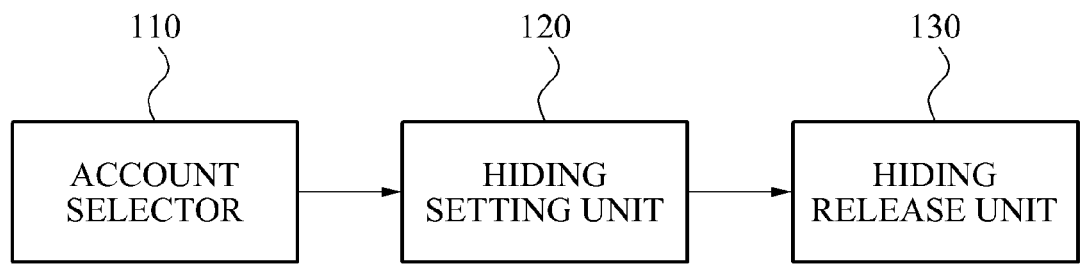
FIG. 1 is a block diagram illustrating an apparatus for managing a web based service account according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram illustrating an apparatus 100 for managing a web based service account according to an embodiment of the present invention.

Referring to FIG. 1, the web based service account management apparatus 100 may include an account selector 110 and a hiding setting unit 120. Also, the web based service account management apparatus 100 may further include a hiding release unit 130.

The account selector 110 may select at least one user account. The account selector 110 may select, from email accounts, at least one user account undesired to be exposed to others. The account selector 110 may select, from messenger user accounts, at least one user account undesired to be exposed to others. Here, an email account and a messenger user account are examples of the web based service account and thus, various types of web based service accounts may be included in the scope of the invention. That is, to protect a particular user or a particular group undesired to be exposed to others, the account selector 110 may select at least one web based user account desired to be protected.

The hiding setting unit 120 may set a hiding indication with respect to the selected at least one user account. That is, in a web based service such as an email, a messenger, and the like, even though a user ID and a password are exposed, the hiding indication may be set to the selected at least one user account to not be exposed to others. As one example, when an email service user does not desire to expose an email received from an account 'gdhong@example.com' of 'honggildong' or an email transmitted to the account 'gdhong@example.com', separate from mails of other people, the user may set the hiding indication to the account 'gdhong@example.com' of 'honggildong'.

In this instance, a mail account itself may be simply set with the hiding indication. A corresponding mail account may be set with the hiding indication by assigning a particular nickname, for example, 'honggildong', 'honggildong1004', and the like to each account to be set with the hiding indication. When setting the hiding indication, information associated with an account set with the hiding indication may not be read unless a password is entered by setting a particular password for each account. In this instance, the same character string as a user account address may be set as a basic password. For example, when setting the hiding indication to the account 'gdhong@example.com', the character string 'gdhong@example.com' may be set as the basic password. When the user desires to set a password excluding the basic password, the user may set a new password by inputting the new password.

When the user account desired to be set with the hiding indication corresponds to an email address, the hiding setting unit 120 may store, in a predetermined mail box separate from a general mail box, a mail received from the at least one user account and a mail transmitted to the at least one user account. Accordingly, it is possible to collectively manage an account desired to be set with the hiding indication through a separate mail box.

When a predetermined criterion is satisfied, the hiding release unit 130 may expose the user account set with the hiding indication. That is, when a justifiable user desires to read the account set with the hiding indication, the hiding release unit 130 may expose the set user account through a user authentication process of determining whether a corresponding user corresponds to the justifiable user. Whether the predetermined criterion such as a user input and the like is satisfied may be determined as an example of the user authentication process. For example, the user authentication may be performed by requesting a corresponding user to input a password assigned when setting the hiding indication or to guess a particular nickname assigned for each account.

For example, when a nickname "honggildong1004' is designated and thereby the hiding indication is set with respect to the account 'gdhong@example.com', and when the character string 'gdhong@example.com' is set as the basic password, the hiding release unit 130 may release the hiding indication by inputting the password or the nickname based on a user selection.

As described above, with respect to a particular account undesired to be exposed to others by the user, the hiding indication may be set and a separate password or nickname may need to be entered. Accordingly, even though the ID and the password are exposed, an additional security may be settable with respect to the account set with the hiding indication.

Figure 2:
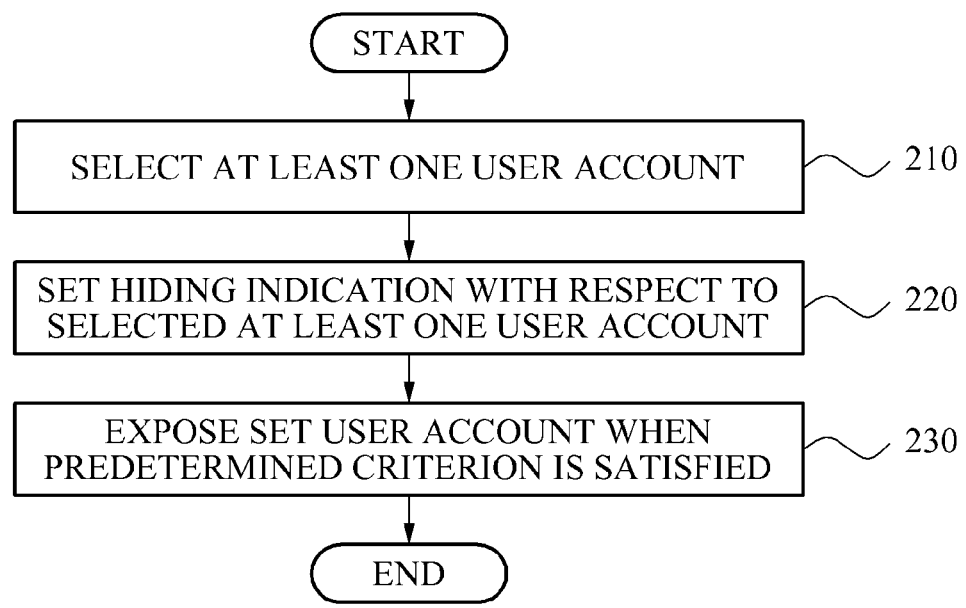
FIG. 2 is a flowchart illustrating a method of managing a web based service account according to an embodiment of the present invention.

FIG. 2 is a flowchart illustrating a method of managing a web based service account according to an embodiment of the present invention.

Referring to FIG. 2, in operation 210, at least one user account may be selected. That is, to protect information from being exposed even though an ID, a password, and the like are exposed, the at least one user account may be selected. In this instance, the at least one user account may be at least one account, for example, an email account, a messenger, and the like, undesired to be exposed others by the user.

In operation 220, a hiding indication may be set to the selected at least one user account. That is, the hiding indication may be set to prevent another user from reading user account information undesired to be exposed to the others without a permission. When the at least one user account corresponds to an email address, the hiding indication may be set by separately storing, in a predetermined mail box, a mail received from the at least one user account and a mail transmitted to the at least one user account.

The hiding indication may be set by setting a password with respect to the at least one user account, and may also be set by setting a new nickname to each account set with the hiding indication. When setting the password, the password may be arbitrarily set by the user. The same character string as a user account address may be set as a basic password.

In operation 230, when a predetermined criterion is satisfied, the at least one user account set with the hiding indication may be exposed. When a justifiable user desires to read the user account set with the hiding indication, the justifiable user may read information associated with the account set with the hiding indication through a user authentication process. For example, when the password is set to the user account set with the hiding indication, the user may read the user account set with the hiding indication by entering the password. When the nickname is set to the user account set with the hiding indication, the user may read the user account set with the hiding indication by accurately entering the nickname.

Descriptions not made with reference to FIG. 2 may refer to descriptions made above with reference to FIG. 1.

Figure 3:
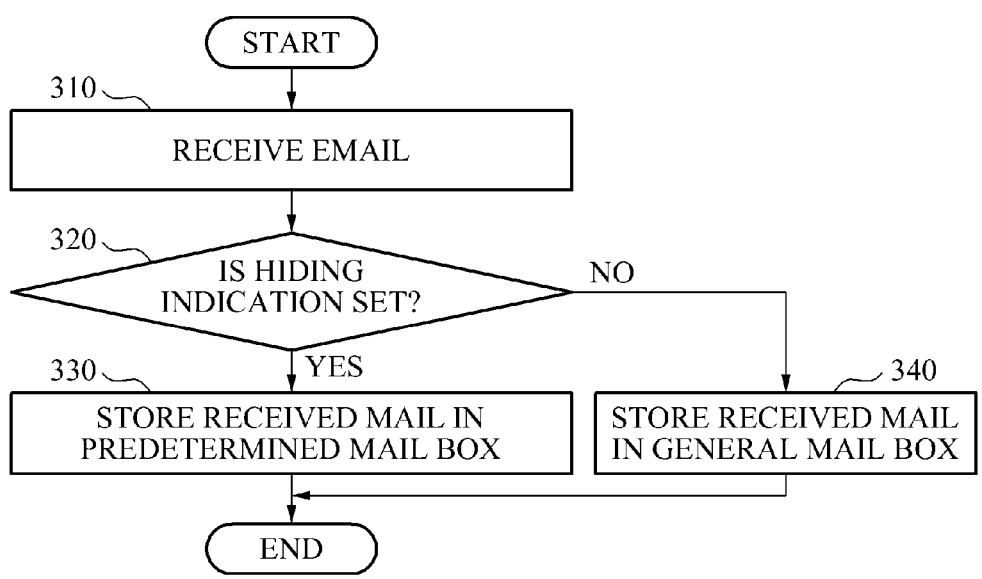
FIG. 3 is a flowchart illustrating a process of receiving an email and storing the email depending on whether a hiding indication is set to an account of the email according to an embodiment of the present invention.

FIG. 3 is a flowchart illustrating a process of receiving an email and storing the email depending on whether a hiding indication is set to an account of the email according to an embodiment of the present invention.

Referring to FIG. 3, when a portion of email accounts is set with the hiding indication, a storage method may vary depending on the account of the received email.

In operation 310, an email receiving server and the like may receive an email.

In operation 320, whether the received email corresponds to an email of an account set with a hiding indication may be determined. For example, when an account matched with the received email account is included in a list of email accounts set with the hiding indication, the received email may be determined to be the email of the account set with the hiding indication.

When the received email corresponds to the email of the account set with the hiding indication, the received mail may be stored in a predetermined mail box separate from a general mail box in operation 330.

When the received email does not correspond to the email of the account set with the hiding indication, the received mail may be stored in the general mail box and be read without the hiding indication in operation 340.

As described above, when transmitting the email, the email of the account set with the hiding indication may be stored in the predetermined mail box by determining whether the email account to be transmitted corresponds to the account set with the hiding indication.

Accordingly, it is possible to integrally manage and store the email set with the hiding indication through a separate mail box.

Figure 4:
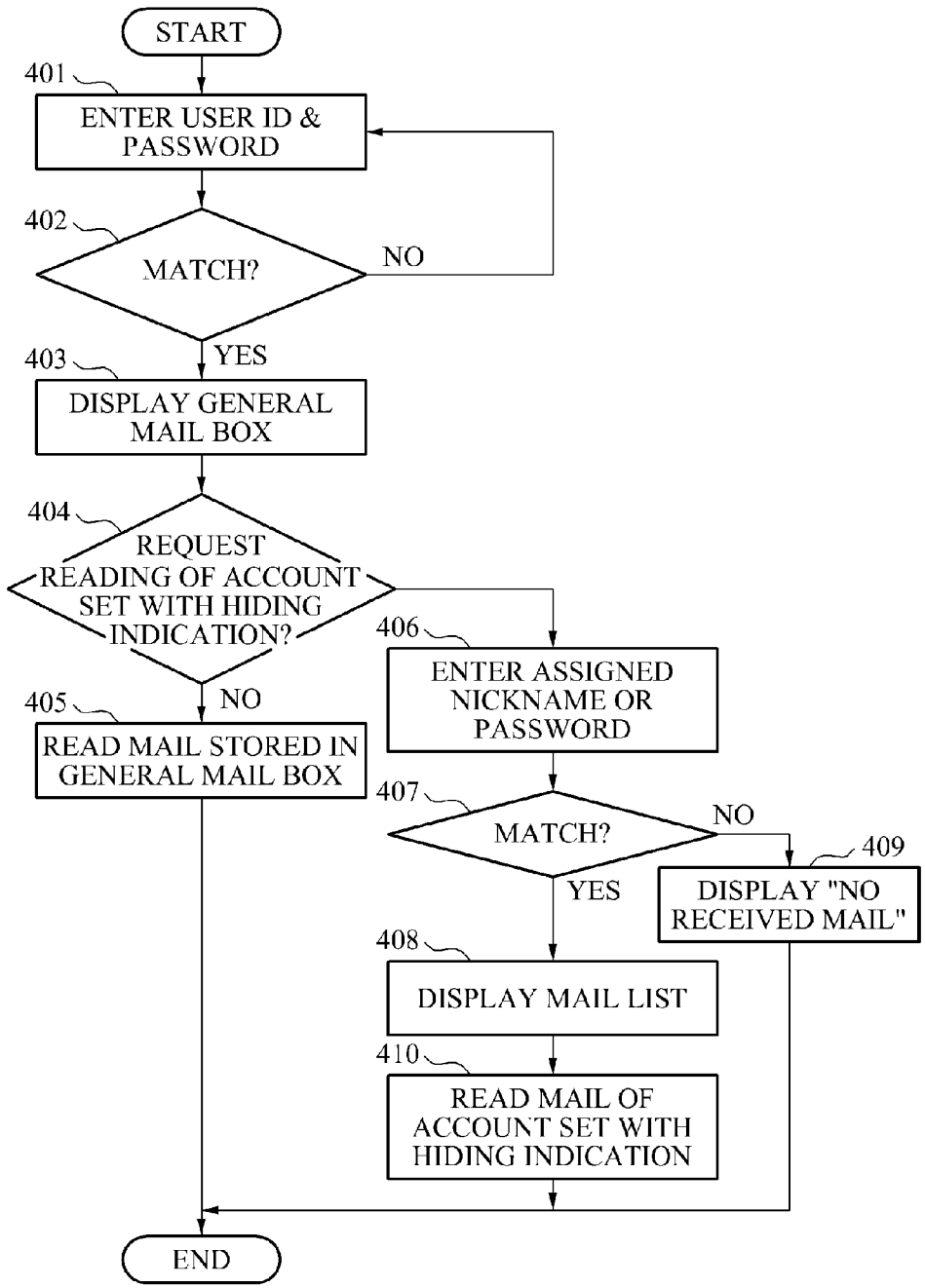
FIG. 4 is a flowchart illustrating a process of reading an email set with a hiding indication through a user authentication according to an embodiment of the present invention.

FIG. 4 is a flowchart illustrating a process of reading an email set with a hiding indication through a user authentication according to an embodiment of the present invention.

In operation 401, a user may enter a user ID and a password to use an email service.

In operation 402, a user authentication may be performed by determining whether the user ID and the password match assigned ID and password. When the user authentication is completed, the user is enabled to normally log in the email service.

In operation 403, since the user authentication is completed and thereby the user is logged in, a general mail box may be displayed for the user to read information. Specifically, even though the user ID and the password are exposed and thereby another user is logged in, the other user may read mails stored in the general mail box. However, a mail box storing mails with respect to the account set with the hiding indication may not be read without going through a separate authentication process.

In operation 404, whether a mail desired to be read by the user corresponds to a mail of the account set with the hiding indication may be determined.

When the mail desired to be read by the user does not correspond to the mail of the account set with the hiding indication, the user may request reading of a mail stored in the general mail box in operation 405. Accordingly, the user may be allowed to read the mail stored in the general mail box.

When the mail desired to be read by the user corresponds to the mail of the account set with the hiding indication, the user may need to enter a nickname or a password assigned when setting the hiding indication in order to verify whether the user corresponds to a justifiable user in operation 406.

In operation 407, whether the user corresponds to the justifiable user may be verified by determining whether the entered nickname or password matches the assigned nickname or password.

When the entered nickname or password matches the assigned nickname or password, a mail list of the account set with the hiding indication may be displayed in operation 408. In operation 410, the user may be enabled to read the mail of the account set with the hiding indication.

When the entered nickname or password does not match the assigned nickname or password, the user does not correspond to the justifiable user and thus, "no received mail" may be displayed.

As described above, a hiding indication may be set to an account designated by a user so that information of the account set with the hiding indication may not be exposed even though a user ID, a password, and the like are exposed. Accordingly, it is possible to protect privacy of the user, and to prevent important information from being exposed.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for managing a web based service account, comprising:
   an account selector to select at least one user account from which a web based service account receives communications or to which the web based service account transmits communications;
   a hiding setting unit to set a hiding indication with respect to the selected at least one user account to hide communications received from or transmitted to the at least one user account from the web based service account; and
   a hiding release unit to expose communications from the at least one user account by the web based service account when a predetermined criterion is satisfied,
   wherein the predetermined criterion comprises entry of a password of the at least one user account separate from an authentication process used to access the web based service account.

2. The apparatus of claim 1, wherein the at least one user account includes an email account.

3. The apparatus of claim 1, wherein the at least one user account includes a messenger account.

4. The apparatus of claim 2, wherein the hiding setting unit stores, in a predetermined mail box, a mail received from the at least one user account and a mail transmitted to the at least one user account.

5. The apparatus of claim 2, wherein the hiding setting unit sets the hiding indication by setting a new nickname with respect to the at least one user account.

6. The apparatus of claim 2, wherein the hiding setting unit sets the hiding indication by setting a password with respect to the at least one user account.

7. The apparatus of claim 6, wherein a same character string as a user account address of the at least one user account is set as a basic password.

8. The apparatus of claim 1 wherein the predetermined criterion further comprises entry of a same character string as a nickname of the at least one user account.

9. A method for managing a web based service account, comprising:
   selecting at least one user account from which a web based service account receives communications or to which the web based service account transmits communications;

setting a hiding indication with respect to the selected at least one user account to hide communications received from or transmitted to the at least one user account from the web based service account; and exposing communications from the at least one user account by the web based service account when a predetermined criterion is satisfied, wherein the predetermined criterion comprises entry of a password of the at least one user account separate from an authentication process used to access the web based service account.

10. The method of claim 9, wherein the at least one user account includes an email account.

11. The method of claim 9, wherein the at least one user account includes a messenger user account.

12. The method of claim 10, wherein the setting comprises storing, in a predetermined mail box, a mail received from the at least one user account and a mail transmitted to the at least one user account.

13. The method of claim 10, wherein the setting comprises setting the hiding indication by setting a new nickname with respect to the at least one user account.

14. The method of claim 10, wherein the setting comprises setting the hiding indication by setting a password with respect to the at least one user account.

15. The method of claim 14, wherein a same character string as a user account address of the at least one user account is set as a basic password.

16. The method of claim 9, wherein the predetermined criterion further comprises entry of a same character string as a nickname of the at least one user account.

\* \* \* \* \*